May 30, 1961 HITOSHI SHIOTSU 2,986,436
BEARING STRUCTURE FOR ROTOR OF HIGH SPEED MOTOR
Filed Sept. 4, 1957 2 Sheets-Sheet 1

INVENTOR:
HITOSHI SHIOTSU

BY
Richardson, David and Nordon
ATTORNEYS.

2,986,436
BEARING STRUCTURE FOR ROTOR OF HIGH SPEED MOTOR

Hitoshi Shiotsu, Tobashi, Mieken, Japan, assignor to Shinko Denki Kabushiki Kaisha, Tokyo, Japan, a corporation of Japan Filed Sept. 4, 1957, Ser. No. 681,933

Claims priority, application Japan June 24, 1957

3 Claims. (Cl. 308—227)

The present invention relates to a bearing construction for a vertical rotary shaft and more particularly to a bearing structure for a vertical rotary shaft in an electric motor which operates at high speeds.

In general, it is most important for the rotor of an electric motor rotating in the range of 10,000 to 20,000 r.p.m. or more, and particularly for a vertical shaft motor, that the bearing which supports the rotor should not only withstand the high speeds of rotation, but should not cause any service interruptions during operation and should also be long lived. In a conventional ball bearing structure operating at high speeds as mentioned above, and even if sufficient lubricating oil is supplied thereto, the lubricating oil film between the bearing balls and their retainers may become so thin or interrupted as to cause bearing failure by overheating of the retainer. Mechanically repeated strains applied to the retainer may occur until it is destroyed, thereby causing the failure of the entire bearing structure. Additionally, because of excessive sliding friction between the bearing balls and their retainers, the life of the bearing structure will be shortened. For the above mentioned reasons, the maximum operational speed of a high speed rotor is actually restricted by the bearing structure. Special lubricating methods for high speed rotation are known but their construction is complicated and costly and the consumption of lubricating oil is excessive.

The present invention has among its objects the provision of a bearing structure which requires no special lubrication, even for high speed rotation. Another object is to provide a bearing structure which will cause fewer difficulties in the course of operation and the life of which will be long. Bearing retainers such as used for conventional ball bearings are not used. There is no part of the structure which involves any sliding friction. The rotating shaft is supported exclusively by rolling members in the present invention.

The invention will be more fully understood by reference to the accompanying drawing, wherein.

Figure 1:
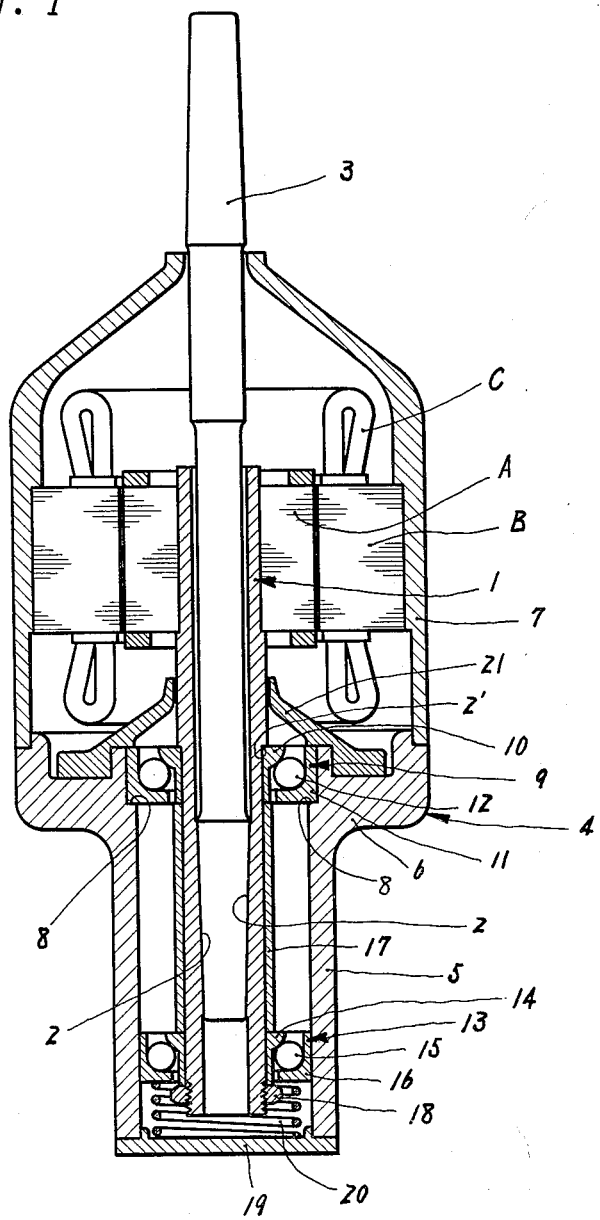
Figure 1 is an elevational view in axial section of a vertical shaft induction motor illustrating one embodiment of the invention.

In Fig. 1, A is a rotor, B is a stator and C is a stator winding. 1 designates generally a hollow substantially cylindrical rotary shaft having an internal bore 2 the lower end portion of which is tapered. The shaft 1 is provided with a step or shoulder 2' at a suitable location along the outer periphery near the middle of its length. Stator B surrounds the upper part of the hollow rotary shaft 1. A shaft 3, adapted to spin a centrifuge or other high speed load (not shown), is disposed in the hollow rotary shaft 1 so as to fit in the lower tapered part of bore 2 to be driven thereby. A bearing holder 4 which consists of a lower hollow cylindrical portion 5 and an upper annular portion 6 projects radially outwardly from the upper end of the hollow cylindrical portion 5. The annular portion 6 is attached to the lower end of the outer frame 7 of the motor. The cylindrical portion 5 encloses the lower half of rotary shaft 1. A step or shoulder 8 is formed in the upper portion of the internal axial bore of the bearing holder 4. An upper bearing assembly 9 which consists of an inner ring or race 10, an outer ring or race 11 and a plurality of bearing balls 12, is interposed between the races 10 and 11 and is fitted between the hollow rotary shaft 1 and the bearing holder 4.

The upper end surface of the inner race 10 contacts the step or shoulder 2' on the hollow shaft 1. The lower end surface of the outer race 11 seats on shoulder 8 of bearing holder 4. The inner race 10 has an upper convex toroidal surface which faces downwardly and inwardly and a lower cylindrical portion. The bearing balls 12 are brought into contact with the convex surface diagonally from below. The outer race 11 has a lower annular upwardly and inwardly facing concave portion and an upper cylindrical portion. The convex portion of the inner race 10 opposes the concave portion of the outer race 11 in a direction diagonal to the axis of shaft 1. The cylindrical portions of rings or races 10 and 11 are concentric and axially offset from each other. The cross-section of the upper convex part of the inner race 10 is a portion of a circle. The cross-section of the lower concave part of outer race 11 defines a concave arc having a radius of curvature substantially equal to or a little larger than the radius of each ball 12 so that the concave portion of outer race 11 may contact the balls 12 at its lower and lateral sides. The balls 12 are arranged side by side in the inner concave corner portion of the outer race 11. The number of balls 12 is so selected that some space may be kept between adjacent balls.

Due to the above mentioned construction, the inner race 10 will be pushed downwardly by the weight of the rotary shaft 1, rotor A and the load (not shown) and will apply a diagonally downwardly and outwardly directed thrust to the balls 12. This diagonal thrust will be transmitted by the balls 12 to the outer race 11. The outer race 11 will be pressed downwardly against the shoulder 8 and the inner peripheral surface of the bore in bearing holder 4 directly above the shoulder 8. Thus, inner ring or race 10, bearing balls 12 and outer ring or race 11 will be held in contact and their relative positions will be correctly maintained. A lower bearing assembly 13 comprises an inner race 14, a plurality of bearing balls 15 and an outer race 16 similar in stucture to the upper bearing assembly 9. Bearing 13 is fitted between the hollow shaft 1 and the bearing holder 4 near the lower end of the shaft 1. On the upper end surface of the inner race 14 there rests a cylindrical sleeve or spacer tube 17 which is loosely fitted over the hollow shaft 1. The upper end of the sleeve 17 contacts the lower end surface of the inner race 10. A nut 18 is threaded on the lower end of the hollow shaft 1 and pushes up the inner race 14 of the lower bearing 13 so as to press the sleeve 17 against the inner race 10 of the upper bearing 9. This maintains constant the relative positions of the inner races 10 and 14 of the upper bearing 9 and the lower bearing 13, respectively.

A cover 19 is secured to the lower end surface of the bearing holder 4. A helical compression spring 20 is interposed between the bottom cover 19 and the lower end surface of the outer race 16 of the lower bearing 13 and yieldingly urges the outer race 16 upwardly to provide a proper contact pressure among the outer race 16, bearing balls 15 and inner race 14, whereby these members will maintain their correct relative positions. An inverted funnel-shaped cover 21 is fitted to the upper end surface of the annular portion 6 of the bearing holder 4 to push downwardly by gravity against the outer race 11 of the upper bearing 9.

In the embodiment of Fig. 1 as described above, when the hollow shaft 1 rotates with the rotation of the rotor A, the respective inner races 10, 14 of the upper and lower bearings will rotate therewith and the respective balls 12 and 15 of the bearings will roll along the respective concavities in the outer rings 12 and 16. It has been found as a result of experiments that, when the balls begin to roll with the rotation of the inner rings, the balls will be arranged at regular intervals. Therefore, retainers as used in conventional bearing structures are not required. The balls will not slide with respect to the inner and outer rings but will only roll therebewteen. Therefore, even though no lubricating oil is used, the frictional losses in the bearings will be very small. Even at the extremely high rotational speed of the rotor, no problems such as over-heating or binding will arise and the rotor will operate very smoothly and efficiently. In order to prevent the balls from sliding between the inner and outer rings, it is necessary to keep the contact among the three parts of each bearing assembly at a proper pressure. This can be attained for the upper bearing by employing a rotor A of proper weight on the rotary shaft 1 and for the lower bearing assembly by selecting a spring 20 having proper resiliency.

Figure 2:
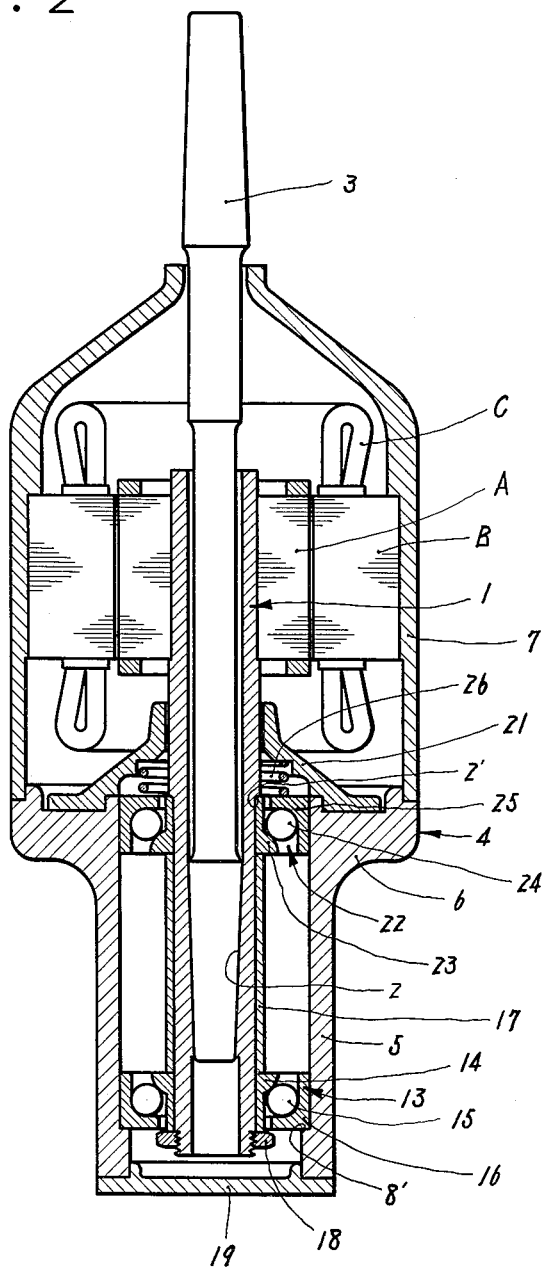
Figure 2 is a view similar to Fig. 1 of a vertical shaft motor illustrating another embodiment of the invention.

Another embodiment of the present invention is shown in Fig. 2.

In this embodiment, which is similar to that of Fig. 1, upper bearing assembly 22 is formed of an inner race 23, a plurality of balls 24 and an outer race 25. The inner race 23 has an upwardly and outwardly directed convex toroidal surface. The balls 24 contact the toroidal surface along a line of contact which is directed diagonally inwarly and downwardly. The outer race 25 contacts the balls 24 diagonally downwardly and inwardly at its inner concave surface. The top of the inner race 23 is in contact with the shoulder 2' of the hollow shaft 1. The bearing holder 4 is not provided with a step 8 as in Fig. 1. The outer peripheral lateral surface of the outer race 25 is in sliding contact with the internal surface of the bore of bearing holder 4. A helical compression spring 26 is interposed between the inverted funnel-shaped cover member 21 which, in turn, rests on the annular section 6 of holder 4. The spring 26 presses yieldingly downwardly against the top of the outer race 25 of the upper bearing 22. The outer race 16 of the lower bearing 13 is in contact with a shoulder 8' provided near the lower end of the internal bore of the bearing holder 4. Thus, the weight of the hollow rotary shaft 1, rotor A and the load (not shown) supported by shaft 3 will be borne by the bearing holder 4 at the step 8', this force being transmitted through the inner race 23 of the upper bearing 22, spacer sleeve 17, inner race 14, balls 15 and outer race 16 of the lower bearing 13. The outer race 25 of the upper bearing 22 will be pushed downwardly by the spring 26 so that a proper contact pressure will be applied to the outer race 25, balls 24 and inner race 23. The force applied by the spring 26 will be further transmitted from the inner race 23 to the sleeve 17. The inner race 14, balls 15 and outer race 16 of the lower bearing 13, will be supported by the shoulder 8' with proper contact pressure therebetween. Thus, contact pressure in a proper range will be applied to the inner ring, balls and outer ring of each of the upper bearing assembly 22 and the lower bearing assembly 13. Upon rotation of the hollow rotary shaft 1 and the inner ring of each bearing, the balls will be arranged in a regular spaced array while rolling without any sliding action on the inner and outer rings. As no retainer is necessary, no lubricating oil will be required even at the highest speed of rotation and no difficulties will be encountered during operation of the bearing assemblies.

As explained with reference to the above two embodiments, according to the present invention, a convex toroidal surface is formed on the inner race whereas the outer race has a concave contact surface. The cross-section of the inner corner portion of the outer race has a concavely-shaped arcuate surface having a radius of curvature a little larger than the radius of each bearing ball. A plurality of bearing balls are annularly arranged so as to contact the convex surface of the inner race and the concave portion of the outer race. Some clearance is provided between the balls of each bearing so that a proper contact pressure may be given to the inner ring, bearing balls and outer ring. As a result, the bearing balls will be arranged at regularly spaced intervals during the rotation of the inner ring. No retainer is required and only rolling friction without sliding action will take place within the bearing during rotation. Therefore, a bearing which requires no lubricating oil can be used in the device, this type of bearing being one which can endure high speed rotation without damage, which has little frictional loss and will operate without mechanical trouble.

What is claimed is:

1. A bearing structure operable without lubrication for a high speed motor, comprising in combination: a generally cylindrical frame supporting a stator; a shaft carrying a rotor rotatably disposed in said stator, the axis of said shaft being vertical; a generally cylindrical bearing holder member secured to one end of the frame in axial alignment therewith and enclosing a lower portion of said shaft; two vertically spaced bearing assemblies disposed between said shaft and said member, said assemblies being spaced by a sleeve slidably fitted on said shaft; each of said bearing assemblies including an inner race, an outer race and a plurality of balls inserted between the inner and outer races; said inner race having cylindrical and convex toroidal portions; said outer race having annular concave and cylindrical portions, the cylindrical portions of the inner and outer races being concentric, oppositely directed and axially offset from each other; said races being movable axially with respect to each other so that the balls are movable axially and radially with respect to said races; and spring means yieldingly pressing against one of the outer races; said one outer race being slidable in said member so that the inner and outer races of each bearing assembly are pressed against the balls disposed therebetween by forces directed diagonally with respect to the axis of said shaft; whereby said balls rotate between the races without sliding and assume equally spaced circumferential positions during rotation at high speed of said rotor and shaft.

2. A bearing structure operable without lubrication for a high speed motor, comprising in combination: a generally cylindrical frame supporting a stator; a shaft carrying a rotor rotatably disposed in said stator, the axis of said shaft being vertical; a generally cylindrical bearing holder member secured to one end of the frame in axial alignment therewith and enclosing a lower portion of said shaft; two vertically spaced bearing assemblies disposed between said shaft and said member, each of said bearing assemblies including an inner ring, an outer ring and a plurality of balls inserted between the inner and outer rings; said inner ring having cylindrical and convex toroidal portions; said outer ring having annular concave and cylindrical portions; the cylindrical portions of the inner and outer rings being concentric, oppositely directed and axially offset from each other; one of said outer rings being movable axially with respect to the other so that the balls are movable axially and radially with respect to said rings; means securing said inner rings against axial movement along said shaft; and spring means yieldingly pressing against the lower one of the outer rings; said lower outer ring being slidable in said member; the inner and outer rings of each bearing assembly are pressed against the balls disposed therebetween by forces directed diagonally with respect to the axis of said shaft; whereby said balls rotate between the rings without sliding and assume equally spaced circumferential positions during rotation at high speed of said rotor and shaft; said spring means being a compression spring applying pressure upwardly against the outer ring of the lower one of said assemblies, the outer ring of the upper bearing assembly being stationary, the inner ring of said upper bearing assembly being urged downwardly by gravitational force including the force produced by the combined weights of said rotor and said shaft.

3. A bearing structure operable without lubrication for a high speed motor, comprising in combination: a generally cylindrical frame supporting a stator; a shaft carrying a rotor rotatably disposed in said stator, the axis of said shaft being vertical; a generally cylindrical bearing holder member secured to one end of the frame in axial alignment therewith and enclosing a lower portion of said shaft; two vertically spaced bearing assemblies disposed between said shaft and said member, each of said bearing assemblies including an inner ring, an outer ring and a plurality of balls inserted between the inner and outer rings; said inner ring having cylindrical and convex toroidal portions; said outer ring having annular concave and cylindrical portions; the cylindrical portions of the inner and outer rings being concentric, oppositely directed and axially offset from each other; one of said outer rings being movable axially with respect to each other so that the balls are movable axially and radially with respect to said rings; means securing said inner rings against axial movement along said shaft; and spring means yieldingly pressing against the upper one of the outer rings; said upper outer ring being slidable in said member; the inner and outer rings of each bearing assembly being pressed against the balls disposed therebetween by forces directed diagonally with respect to the axis of said shaft; whereby said balls rotate between the rings without sliding and assume equally spaced circumferential positions during rotation at high speed of said rotor and shaft, said spring means being a compression spring applying pressure downwardly against the outer ring of the upper one of said bearing assemblies, the outer ring of the lower bearing assembly being stationary, the inner ring of the lower bearing assembly being urged downwardly by gravitational force including the force produced by the combined weights of said rotor and said shaft.

References Cited in the file of this patent

UNITED STATES PATENTS

| | | |
|---|---|---|
| 701,808 | Gihon | June 3, 1902 |
| 856,228 | Cromwell | June 11, 1907 |
| 1,292,026 | North | Jan. 21, 1919 |
| 1,767,272 | Beaman | June 24, 1930 |
| 2,038,286 | Hasbrouch et al. | Apr. 21, 1936 |
| 2,310,685 | Fraser | Feb. 9, 1943 |

FOREIGN PATENTS

| | | |
|---|---|---|
| 100,226 | Great Britain | July 27, 1916 |
| 228,417 | Great Britain | Feb. 5, 1925 |
| 602,378 | France | Dec. 23, 1925 |
| 668,080 | France | July 2, 1929 |